April 14, 1936. O. FISCHER 2,037,223
TONGS FOR REMOVING AND PUTTING IN PLACE THE KEY
RINGS OF TYPEWRITING MACHINES AND THE LIKE
Filed Nov. 7, 1934
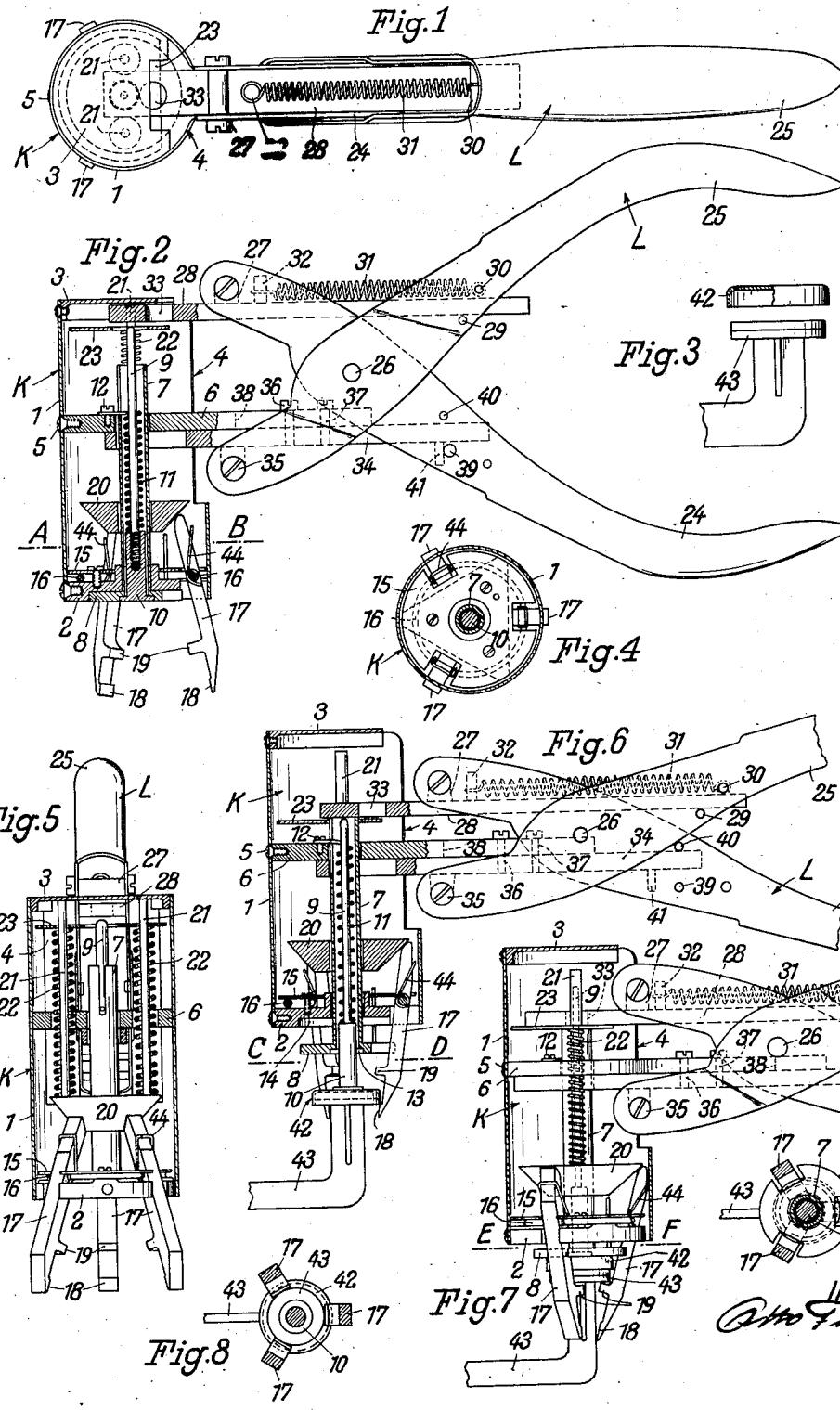

Patented Apr. 14, 1936

2,037,223

UNITED STATES PATENT OFFICE 2,037,223

TONGS FOR REMOVING AND PUTTING IN PLACE THE KEY RINGS OF TYPEWRITING MACHINES AND THE LIKE

Otto Fischer, Berlin, Germany, assignor to Wilhelm Dreusicke & Co. G. m. b. H., Berlin, Germany Application November 7, 1934, Serial No. 751,906
In Germany October 4, 1933

8 Claims. (Cl. 29—85)

The invention relates to tongs for removing and putting on the key rings of typewriting machines or the like with two pressure rams, the one for the pulling off and the other for the putting on, both controlled from the handle of the tongs, said rams cooperating with grippers arranged in a circle and serving as a counterbearing for the key ring or the key.

In the tongs of this type of known construction one single control element adapted to be operated from the handle is employed for the two pressure rams. At every change of service a constructional alteration of the tongs must therefore be effected, this being evidently tedious and requires time.

This inconvenience is avoided according to the invention in that the two pressure rams arranged together with the tongs have each a separate control element, said control elements being adapted to be operated selectively from the same handle of the tongs. In this manner it is attained that one and the same tool may be used without any constructional alteration for pulling off as well as for putting on the key rings, so that the operation is considerably simplified and much time is saved.

The gripping movements of the grippers arranged in a circle around the pressure rams are preferably controllable by a conical driving element adapted to be moved from the tongs handle in accordance with the driving movements of the pressure rams. By this measure it is attained that the novel tongs can be operated with only one hand, this simplifying further the operation.

An embodiment of the invention is illustrated by way of example on the accompanying drawing in which:—

Fig. 1 is a top plan view of the tongs.

Fig. 2 is a side elevation of the tongs, the case being shown in section.

Fig. 3 shows a key with key ring partly broken away.

Fig. 4 is a section on line A—B of Fig. 2.

Fig. 5 shows a longitudinal section through the tongs casing turned 90° relative to Fig. 2.

Fig. 6 is a similar view of the tongs as illustrated in Fig. 2, the pulling off ram being depressed.

Fig. 7 shows in a similar manner to Fig. 6 the tongs with depressed putting on ram.

Fig. 8 is a section on line C—D of Fig. 6.

Fig. 9 is a section on line E—F of Fig. 7.

The tongs consists of the tongs head K and the tongs handle L.

The tongs head K comprises a side wall 1, a bottom 2 and a lid 3. These parts are connected the one with the other by screws. The side wall 1 has a slit 4 through which projects a supporting bar 6 fixed on the wall 1 by little screws 5. A tube 7 extends through the supporting bar 6 and carries at its lower end a pressure ram 8. A rod 9 extends through the tube 7 and carries a ram 10 at its lower end. The rod 9 is screwed into the ram 10. A spiral spring 11 is wound around the rod 9, one end of the spring being fixed to the rod and the other end by means of the screw 12 on the supporting bar 6. This spring maintains the ram 10 and the ram 8 bearing against the same in the position ready for operation shown in Fig. 2. In this position the head of the ram engages in a recess 13 of the ram 8, whereas the ram 8 engages in a recess 14 of the bottom plate 2. A ring 16 is securely held by a disc 15 on the bottom plate 2 and serves as pivot axle for grippers 17 arranged in a circle around the rams 8, 10. The grippers 17 have claws 18 and 19, those at 19 being longer than the claws 18. The other end of the gripper 17 bears against a conical driving element 20 shiftably mounted on the tube 7. The grippers 17 are held in the spread position by springs 44. Rods 21 are fixed in the conical driving element and bear against the lid 3 in the upper extreme position of the driving element. Spiral springs 22 wound around the rods 21 bear against a pressure plate 23 which is freely movable.

The tongs handle L consists of two levers 24, 25 oscillatable around a common axle 26. A bar 28 is pivotally mounted at 27 on the lever 24 and securely held between pins 29, 30 of the lever 25. One end of the spring 31 is attached to the pin 30, the other end of this spring bearing against a pin 32 of the bar 28. This spiral spring 31 maintains the levers 24, 25 in the spread position; the bar 28 has an aperture 33 which in the one position of operation of the tongs handle L is lying above the rod 9 (Fig. 7).

A bar 34 is pivotally mounted at 35 on the lever 25 of the handle L. This bar 32 carries two bolts 36, 37 which project through a guide slot 38 in the bar 6. The bar 34 is maintained in its position by pins 39, 40 of the lever 24. On the bar 34 a pin 41 is fixed designed to limit the spreading width of the handle L. In the position shown in Fig. 2 the tongs is in the operative position. If the key ring 42 shown in Fig. 3 has to be pressed on to the key 43 the key ring is first placed on the key, whereupon the tongs are placed on the ring 42 so that the claws 19 of the gripper 17 are under the key 43. After the handle 11 has been brought into the position relative to the tongs head K shown in Fig. 7 the bar 28 is moved towards the bar 34 by pressing together the free ends of the levers 24, 25. The rod 9 engages then in the aperture 33 of the bar 28, the latter bearing against the upper edge of the tube 7. If the pressing together of the levers 24, 25 continues, the tube 7 and the ram 8 are moved downwards in opposition to the pulling force of spring 11, the ram 10 being driven at the same time. During the downward movement of the bar 28 the springs 22 and with the same the conical element 20 are driven. The conical element 20 slides on the tube 7 so that the upper ends of the grippers 17 slide upwards on the conical surface of the driving element 20, the lower ends of the grippers moving consequently in inward direction and gripping the key 43. The claws 19 serve then as counter bearing for the key 43 so that by means of the ram 8 sufficient pressure can be exerted upon the key ring 42 to press the same on to the key 43.

If the levers 24, 25 are released, the bar 28 moves upwards into the position shown in Fig. 2 under the influence of the spring 31, the springs 22 expanding so that the grippers 17 are again relieved of pressure. The rams 8 and 10 return into their operative position under the action of the spring 11.

If the key ring 42 has to be removed from the key 43, the tongs handle L is first brought from its position shown in Fig. 7 into the position shown in Fig. 2. The levers 24, 25 are then pressed together so that the bar 28 bears at once on to the rod 9 and the ram 10 fixed on the lower end of this rod is moved downwards. During this period the conical driving element 20 descends again so that the grippers 17 are oscillated in inward direction. The short claws 18 then grip under the lower edge of the key ring 42 (Fig. 9), whereas, when the pressing together of the levers 24, 25 continues, the ram 10 comes to bear upon the key 43. If the levers 24, 25 are still further pressed together, the ring 42 is pulled off the key 43. After the levers 24, 25 have been liberated, all elements return into the operative position in a similar manner as above described.

I claim:—

1. Tongs for removing and putting on key rings of typewriting machines and the like, comprising in combination two pivotally connected levers forming the tongs handles, a tongs head composed of a side wall having a longitudinal slot at its upper end and a bottom plate having a central hole and a plurality of apertures distributed about its periphery, means extending through said slot and connecting said head with one of said levers, inner and outer telescopically related rams accommodated in said head and projecting from the bottom plate thereof, means on the other of said levers extending through the slot in said head for mutually shifting said pressure rams relatively to each other and to said head, grippers pivotally mounted on said bottom plate one in each of the peripheral apertures thereof, and a conical member fixed on said outer ram and adapted to bear against the inner ends of said grippers and approach the outer ends thereof during the downward movement of said pressure rams out of said casing.

2. Tongs as specified in claim 1, comprising in combination with the inner and outer telescopically related pressure rams, a spring acting on said rams tending to return said rams into their initial position ready for use.

3. Tongs as specified in claim 1, comprising in combination with the tongs head and the inner and outer telescopically related pressure rams, a shoulder on said outer ram serving as abutment for said inner ram, and a spring connecting said inner ram to said tongs head.

4. In tongs as specified in claim 1 the means connecting said head with one of the levers, comprising two bars mutually shiftable in longitudinal direction, one of said bars rigidly connected to the inner side of the side wall of said head and having a hole adapted to guide the outer ram, and the other bar pivotally connected to the lever and having a slot surrounding said rams to allow said last mentioned bar to shift radially relatively to said rams.

5. Tongs as specified in claim 1, in which the grippers are arranged in a circle about said rams and provided with two sets of claws, one set adapted to engage under the key rings to pull off the key rings from the keys, and the other set adapted to serve as support for the key when fitting the key ring.

6. Tongs as specified in claim 1, in which the outer ram comprises a tube extending through the central aperture in the bottom plate of the tongs head and a pressure head on the outer side of the bottom plate of the tongs head, the inner ram comprises a rod extending through said tube and carrying a pressure head at its lower end, and the means for shifting said rams comprises a bar pivotally mounted on one of the levers adapted, when said levers are approached, to first bear against the end of said rod to shift said inner ram relatively to said outer ram and then bear against the upper end of said tube to shift said outer ram relative to the tongs head, said bar having an aperture to receive the upper end of said rod towards the end of the approaching movement of said levers.

7. Tongs as specified in claim 1, in which springs are mounted in the bottom plate of the tongs head and tend to maintain the grippers in inoperative position ready for use.

8. Tongs as specified in claim 1, comprising in combination with the tongs head, the pivotally connected handle levers, the conical element, and the ram operating means, two parallel rods extending from the upper side of said conical member, a pressure plate freely movable on said rods, two spiral springs one on each of said rods and each bearing at one end against said member and at their other end against the underside of said pressure plate, said springs adapted to be compressed by said operating means through the intermediary of said pressure plate when pressure is exerted on said handle levers, and to again spread said levers when this pressure is removed.

OTTO FISCHER.